United States Patent
Wijbrans et al.

(10) Patent No.: US 10,659,164 B2
(45) Date of Patent: May 19, 2020

(54) OPTICAL TRANSMITTER, OPTICAL RECEIVER AND OPTICAL LINK

(71) Applicant: KONINKLIJKE PHILIPS N.V., Eindhoven (NL)

(72) Inventors: Klaas Cornelis Jan Wijbrans, Rijen (NL); Gerhardus Wilhelmus Lucassen, Eindhoven (NL); Martinus Bernardus Van Der Mark, Best (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/307,958

(22) PCT Filed: Jun. 17, 2017

(86) PCT No.: PCT/EP2017/064855
§ 371 (c)(1),
(2) Date: Dec. 7, 2018

(87) PCT Pub. No.: WO2017/220454
PCT Pub. Date: Dec. 28, 2017

(65) Prior Publication Data
US 2019/0312643 A1    Oct. 10, 2019

(30) Foreign Application Priority Data

Jun. 23, 2016  (EP) .................................... 16175971

(51) Int. Cl.
*H04B 10/69*   (2013.01)
*H04J 14/04*   (2006.01)
(Continued)

(52) U.S. Cl.
CPC ......... *H04B 10/2581* (2013.01); *H04B 10/40* (2013.01); *H04B 10/502* (2013.01);
(Continued)

(58) Field of Classification Search
CPC combination set(s) only.
See application file for complete search history.

(56) References Cited

U.S. PATENT DOCUMENTS 5,963,349 A    10/1999  Norte
6,782,205 B2 *  8/2004  Trisnadi ............... G02B 6/2713
                                                398/197

(Continued)

FOREIGN PATENT DOCUMENTS

WO    2014072891 A1    5/2014

OTHER PUBLICATIONS

Sakaguchi, J. et al "19-Core Fiber Transmission of 19×100×172-Gb/s SDM-WDM-PDM-QPSK signals at 305Tb/s", Optical Fiber Communication Conference and Exposition Mar. 2012.

(Continued)

*Primary Examiner* — Omar S Ismail

(57) ABSTRACT

The present invention relates to an optical link, comprising an optical converter circuit (16) having an optoelectronic device (18) and circuitry (20) connected to the optoelectronic device (18). The optoelectronic device (18) has a plurality of individual optoelectronic segments (18a-18i). The optical link further comprises an elongated optical guide (14) having a single optical fiber optically connected at a first end to the optoelectronic device (18) and configured to transmit light away from the optoelectronic device (18), wherein the individual optoelectronic segments (18a-18i) have different positions relative to the first end of the optical fiber so that light beams emitted by the optoelectronic segments (18a-18i) are coupled into the optical fiber under different angles. The optoelectronic device (18) is configured to receive from the circuitry (20) on at least some of the segments (18a-18i) a plurality of data streams and optically send the plurality of data streams as spatially diverse data streams into the optical guide (14). The optical link further (Continued)

comprises a photo detector arrangement (28) optically connected to a second end of the optical guide (14) and having a plurality of photo detector segments (28a-28i) arranged to optically receive the plurality of data streams from the optoelectronic device (18), and a processing unit (30) associated with the photo detector arrangement (28) and configured to extract the plurality of data streams from the photo detector arrangement (28).

17 Claims, 2 Drawing Sheets

(51) Int. Cl.
    *H04B 10/2581*     (2013.01)
    *H04B 10/50*     (2013.01)
    *H04B 10/516*     (2013.01)
    *H04B 10/40*     (2013.01)

(52) U.S. Cl.
    CPC ........... *H04B 10/516* (2013.01); *H04B 10/69* (2013.01); *H04J 14/04* (2013.01)

(56) References Cited

U.S. PATENT DOCUMENTS

| | | |
|---|---|---|
| 7,939,839 B2 | 5/2011 | Hasnain |
| 8,447,187 B2 | 5/2013 | Ledentsov |
| 8,632,466 B2 | 1/2014 | Zhang |
| 2002/0009270 A1* | 1/2002 | Laor ................... G02B 6/4202 385/95 |
| 2003/0165306 A1* | 9/2003 | Iida ................... G02B 6/12026 385/92 |
| 2004/0252952 A1* | 12/2004 | Ayliffe ................... G02B 6/32 385/92 |
| 2014/0147119 A1* | 5/2014 | Watanabe .......... H04B 10/5051 398/76 |
| 2015/0030339 A1* | 1/2015 | Margalit .............. H04B 10/506 398/183 |
| 2016/0349470 A1* | 12/2016 | Cheng ................. G02B 6/4204 |

OTHER PUBLICATIONS

Sleiffer, V.A., et al "Mode-Division-Multiplexed 3×112-Gb/s DP-QPSK Transmission over 80-km few-mode fiber with inline MM-EDFA and Blind DSP", 38th European Conference and Exhibition on Optical Communications Sep. 2012.

Ryf, Roland et al "Mode-Division Multiplexing over 96 km of Few-Mode Fiber using Coherent 6×6 MIMO Processing", Journal of Lightwave Technology, IEEE Service Center, vol. 30, No. 4, Feb. 2012, pp. 521-531.

Haydaroglu, Iskender et al "Optical Power Delivery and Data Transmission in a Wireless and Batteryless Microsystem using a Single Light Emitting Diode", Journal of Microelectromechanical Systems, vol. 24, No. 1 Feb. 2015.

Van Der Mark, Martin B. et al "All-optical power and data transfer in catheters using an efficient LED", Proc. of SPIE vol. 9317, 2015.

Grin lens: www.grintech.de, 2018.

* cited by examiner

OPTICAL TRANSMITTER, OPTICAL RECEIVER AND OPTICAL LINK

CROSS-REFERENCE TO PRIOR APPLICATIONS

This application is the U.S. National Phase application under 35 U.S.C. § 371 of International Application No. PCT/EP2017/064855, filed on Jun. 17, 2017, which claims the benefit of European Patent Application No. 16175971.7, filed on Jun. 23, 2016. These applications are hereby incorporated by reference herein.

FIELD OF THE INVENTION

The present invention relates to optical transmitters, optical receivers and optical links and methods of operating optical links. An optical link may be used for optically supplying energy to a remote electronic device, and/or for data transmission to and from a remote electronic device.

BACKGROUND OF THE INVENTION

An optical link having an optical transmitter and an optical receiver is useful in applications, where power delivery and/or data transmission via electrical wires is problematic, in particular due to size restrictions of the power delivery and/or data transmission paths. Although the present invention is not limited to a use in medical applications, the present invention will be described herein with respect to medical applications.

There is a clear and ongoing trend to replace conventional surgical procedures with minimally invasive interventions. Reduced trauma, shorter hospital stay and reduced costs are the most important drivers of the adoption of minimally invasive techniques. To enable further innovation in medical instrumentation—thus enabling more advanced and more challenging minimally invasive interventions—there is a need to integrate miniature sensors for in-body imaging and physiological measurement in instruments like catheters and guide wires.

Data and power delivery to the tip of long and thin devices such as a medical catheter or guide wire for imaging, sensing, sensitizing or even ablation can be challenging. Including, on top of that, a high data rate return channel from the distal to the proximal end is even more problematic. This is due to several reasons.

Firstly, the combination of the small cross-section (i.e. small diameter), necessary for the medical intervention, combined with the long length of a guide wire or catheter does severely limit the total number of electrical wires that can be integrated in such an instrument.

Secondly, the integration of multiple electrical wires compromises the flexibility of the instrument, while flexibility is a key property of this type of instruments.

Thirdly, for high data rate, such as e.g. required for an ultrasound transducer at the tip or for sensitive measurements, one often requires coaxial cables which need even more space compared to single-core wires.

Fourthly, instruments with electrical wires typically are not compatible with the use of magnetic resonance imaging due to resonances in/of the electric wiring leading to electromagnetic interference in the connected electronics and also possibly leading to tissue heating. And furthermore, thin electrical cables typically cannot support a relatively high amount of power for use at the distal end of the catheter.

Also, because of their disposable use, catheters and guide wires must be manufactured in a relatively simple and cost-effective way.

Sakaguchi et al.: "19-core fiber transmission of 19×100× 172-Gb/s SDM-WDM-PDM-QPSK signals at 305 Tb/s", Optical Fiber Communication Conference and Exposition, 2012 and the National Fiber Optical Engineers Conference, IEE, 4 Mar. 2012, pages 1-3, report on a free-space coupling system combined with a multi-core fiber enabling upscaling to a record space-division-multiplexed channel number of 19.

Sleiffer et al.: "Mode-division-multiplexed 3×112-Gb/s DP-QPSK transmission over 80-km few-mode fiber with inline MM-EDFA and Blind DSP", 2012, 38th European Conference and Exhibition on Optical Communications, 16 Sep. 2012, pages 1-3 describe transmission of a 3×112-GB/s DP-QPSK mode-division-multiplexed signal up to 80 km, with and without multi-mode EDFA, using blind 6×6 MIMO digital signal processing.

Roland Ryf et al.; "Mode-Division Multiplexing Over 96 km of Few-Mode Fiber Using Coherent 6×6 MIMO Processing", Journal of Lightwave Technology, IEEE Service Center, New York, US, vol. 30, no. 4, 1 Feb. 2012, pages 521-531 describe simultaneous transmission of six spatial and polarization modes, each carrying 40 Gb/s quadrature-phase-shift-key channels over 96 km of a low-differential group delay few-mode fiber. U.S. Pat. No. 5,963,349 A discloses an optical wavelength-division multiplexed bidirectional data link using a single multi-mode fiber.

WO 2014/072891 A1 describes an optical link comprising an optical guide through which optical energy is transmitted to a remote distal optoelectronic converter having an optoelectronic device in form of a light emitting diode (LED) which converts the optical energy into electrical energy for powering the optical converter circuit and one or more electronic devices. On the one hand, this known optical link is effective in providing sufficient power delivery capability to actuate an ultrasound catheter, because the optoelectronic device has a large surface area necessary to achieve the necessary power output. On the other hand, the large surface area of the optoelectronic device limits the bandwidth and, hence, the data rate of data transmission. For this reason, it is further proposed there to use a separate optoelectronic device for data transmission in the return path from the distal end to the proximal end. However, a separate optoelectronic device for data transmission and a separate optoelectronic device for energy harvesting add significant complexity to both the electronic and optical part of the interventional instrument using the optical link.

Therefore, there is a need for an improved optical transmitter, optical receiver and optical link which retains the capability of achieving sufficient power output, but increases the bandwidth and data rate in the return path.

SUMMARY OF THE INVENTION

It is an object of the present invention to provide an optical transmitter and an optical receiver which are capable of transmitting data with high data rate, while maintaining the capability to achieve a power output sufficient for powering one or more electronic devices.

In a first aspect of the present invention, an optical transmitter is provided, comprising:

an optical converter circuit having an optoelectronic device and circuitry connected to the optoelectronic device, the optoelectronic device having a plurality of individual optoelectronic segments, an elongated optical guide having a single optical fiber optically connected at a first end to the optoelectronic device and configured to transmit light away from the optoelectronic device, wherein the individual optoelectronic segments have different positions relative to the first end of the optical fiber so that light beams emitted by the optoelectronic segments are coupled into the optical fiber under different angles, the optoelectronic device being configured to receive from the circuitry on at least some of the segments a plurality of data streams and optically send, via the light beams emitted by the at least some of the segments, the plurality of data streams as spatially diverse data streams into the optical guide.

The optical transmitter according to the present invention thus uses an optoelectronic device having a plurality of individual optoelectronic segments. The individual optoelectronic segments may be segments of a single segmented light emitting diode (LED), or may be single LEDs forming together the optoelectronic device. Using an optoelectronic device having a plurality of individual optoelectronic segments has several advantages. A large-surface area optoelectronic device has a high capacitance which in turn limits the bandwidth and, hence, the data rate. When using an optoelectronic device having a plurality of individual segments, each of the segments has a reduced surface area and, thus, a reduced capacitance. Thus, a single segment of the optoelectronic device can transmit data with larger bandwidth and higher data rate.

According to the invention, at least some of the segments of the optoelectronic device are used for data transmission in the return path from the optoelectronic device to a receiver. Each of these segments thus forms a single data transmission channel. Thereby, it is possible to increase the data rate by space-division multiplexing. As described herein, the optoelectronic device is particularly suitable for space-division multiplexing by spatially modulating a plurality of separate data streams onto at least some or all of the segments. In this case, each of the at least some or each of all the segments can send an optical signal modulated with a respective data stream under a different angle into the optical fiber of the optical guide for transmitting the data streams. Such an angle diversity is maintained in the optical fiber over at least a few meters so that the single data streams can be distinguished on a receiver.

The optoelectronic device is configured to send the plurality of data streams as spatially diverse data streams. The plurality of data streams may be spatially modulated onto the segments of the optoelectronic device, and the segments then send the data streams through the optical guide, e.g. the optical fiber, to a receiver. Thus, space-division multiplexing may be achieved similar to the techniques used in WiFi 802.11n/802.11ac standards using spatial multiplexing.

The plurality of data streams may come from a plurality of different data sources, e.g. from a plurality of measuring devices, or from a single data source after having been split into the plurality of data streams.

The optical guide of the optical transmitter according to the present invention has an optical fiber which may be a single-core or a multiple-core optical fiber. In case of a single-core optical fiber, the optical fiber preferably is a multimode optical fiber.

Using an optoelectronic device having a plurality of individual segments has a further advantage of being less complex and more cost-effective in comparison with separate optical converters for energy harvesting and data transmission as proposed in the prior art discussed above. An optoelectronic device having a plurality of individual optoelectronic segments namely can be used for data transmission with high rate and for energy harvesting.

In particular, as provided in a preferred embodiment, if at least some of the segments of the optoelectronic device are connected in series, a high electrical power output can be obtained sufficient for powering one or more electronic devices and/or the optical converter circuit.

The optical transmitter according to the invention may be configured such that at least some of the segments of the optoelectronic device are used for energy harvesting, i.e. for converting optical energy into electrical energy, while at least some other or the at least some same of the segments are used for data transmission in the return path. Even here, the advantage of large bandwidth and high data rate is obtained due to the reduced surface area of the single segments.

Thus, the optoelectronic device is further preferably configured to receive optical energy through the optical guide and convert the optical energy into electrical energy.

In this embodiment, the optical transmitter according to the invention provides at the same time an optical output with high data rate and power continuity for supplying the electronic converter circuit and/or other electronic devices with sufficient electrical energy.

There is another benefit of the afore-mentioned embodiment, according to which the optoelectronic device is configured to harvest energy from incoming light and to transmit data in the return path. In particular, if photo-induced electroluminescence is used, energy can be received and data transmitted back at the same time.

A further advantage of the afore-mentioned embodiment is that the segments of the optoelectronic device may be used for differential signaling in the return path. Differential signaling means modulating a segment according to a first modulation and modulating one or more other segments, which send(s) (its) their light under different angle(s) into the optical guide, with a second modulation which is the reverse of the first modulation. The advantage is a more constant total power consumption of the optoelectronic device and a more robust demodulation at the photo detector arrangement side.

Further preferably, the circuitry of the optical converter circuit has a data stream splitter configured to split a single original data stream into a plurality of separate data streams, wherein each of the separate data streams is input to one of at least some of the segments, and wherein the circuitry further preferably has modulators at an output of the data beam splitter and at an input of at least some of the segments, the modulators being configured to modulate, in particular spatially modulate the separate data streams onto the at least some of the segments of the optoelectronic device.

In this way, a single original data stream is broken down into multiple single data streams which then can be modulated onto the segments of the optoelectronic device. The modulators modulate the single data streams broken down from the original continuous data stream onto the single segments, thus enabling spatial modulation of the separate data streams onto the optoelectronic device.

Further advantageously, the data stream splitter may be further configured to add a preamble to each of the separate data streams for enabling recognition of the spatially diverse data streams when received by a receiver.

In this embodiment, at least some or all of the segments of the optoelectronic device send data streams using a preamble that is recognizable. At a receiver having a photo detector arrangement having a plurality of photo detector segments, which will be described later, a correlation may be performed between the plurality of photo detector segments against the preambles so that the maximum signal is achieved for each preamble as well as suppression of the signals of the other photo detector segments. This will give the different data streams that need to be recognized. The same correlation is then used when the actual data is being sent to reconstruct the data stream of a specific segment. Thus, multiplexing may be based on segments sending their light under different angles and then reconstructing those from the photo detector segments, as the angle under which the light is sent changes only a little or not over the length of the fiber.

In a further embodiment, the at least some of the segments of the optoelectronic device of the transmitter to which the separate data streams are input have different center wavelengths of light emission. This embodiment enables wavelength-based multiplexing on the optoelectronic device side and wavelength-based demultiplexing at the receiver side. Wavelength multiplexing/demultiplexing may thus preferably be combined with the previously mentioned space-division multiplexing.

As already mentioned above, at least some of the optoelectronic segments are preferably connected in series. Further preferably, all of the optoelectronic segments are connected in series. A series connection of the optoelectronic segments has the advantage of providing a high voltage output when converting incoming optical energy into electrical energy.

Further preferably, the optoelectronic device is a light emitting diode segmented into a plurality of light diode segments. In this embodiment, an LED may be split into a plurality of single micro-LEDs with each micro-LED having a reduced surface area in comparison with a conventional LED. Using a segmented LED is highly cost-effective for use in the present invention. It is also possible the optoelectronic device is formed by a plurality of single optoelectronic devices, e.g. a plurality of single LEDs arranged at different positions with respect to the light entrance end of the optical fiber.

The optical transmitter according to the invention further preferably comprises a gradient refractive index (GRIN) lens arranged between the optoelectronic device and the optical guide for optically coupling the light emitted from the optoelectronic device into the optical guide, and vice versa.

The GRIN lens advantageously collimates the light propagating through the optical guide onto the optoelectronic device, thereby ensuring even power distribution to at least some or all of the segments of the optoelectronic device, which is useful for high voltage output, when the optical transmitter is also used for energy harvesting. Further, the GRIN lens couples the light emitted by the optoelectronic device into the optical guide for data transmission. In particular, when the optical guide is a single core fiber, the GRIN lens projects the light emitted by the optoelectronic device into the fiber core. The GRIN lens preferably has a high numerical aperture (NA), for example higher than 0.2, or higher than 0.3, or higher than 0.4, or higher than 0.5, or higher than 0.6, or higher than 0.7. Further, the numerical aperture of the light entrance/output end of the optical guide adjacent to the GRIN lens may be matched to the numerical aperture of the GRIN lens. It is to be understood that while a GRIN lens is preferred because it enables a small and robust implementation, the optical fiber of the optical guide may be coupled with the optoelectronic device by a conventional lens or even without a lens by precise positioning the optical fiber with respect to the optoelectronic device.

In a second aspect of the invention, an optical receiver is provided, comprising:

a photo detector arrangement having a plurality of photo detector segments arranged to optically receive a plurality of light beams propagating under different propagation angles and carrying a plurality of data streams from an optical guide, and a processing unit associated with the photo detector arrangement and configured to extract the plurality of data streams from the photo detector arrangement.

The photo detector arrangement of the optical receiver according to the invention has a plurality of photo detector segments configured to optically receive data streams, in particular as sent by the optoelectronic device of the optical transmitter according to the invention. The processing unit of the optical receiver according to the invention is configured to extract the data stream or data streams from the photo detector arrangement for further analysis.

In case that a plurality of data streams are received by the photo detector arrangement, the processing unit is further preferably configured to combine the plurality of extracted data streams into a single data stream, thus the processing unit is configured to demultiplex the data streams extracted from the photo detector arrangement.

The processing unit is preferably configured to extract the data streams from the photo detector arrangement by using maximum ratio combining across the photo detector segments.

Maximum ratio combining is a common technique to combine multiple received data streams into a single continuous data stream and can be advantageously used in the present invention to extract the separate data streams from the plurality of photo detectors and to combine them into a single high rate data stream.

In a third aspect of the invention, an optical link is provided, comprising an optical transmitter according to the first aspect and an optical receiver according to the second aspect.

According to a fourth aspect, an optical console is provided, comprising an optical receiver according to the second aspect The optical console according to the invention preferably comprises a light source configured to emit a light beam for transmission through the optical guide to the optoelectronic device of the transmitter. Such a light source may be a VCSEL (Vertical Cavity Surface Emitting Laser), or any other light source suitable for emitting light with high optical energy. The light emission of the light source may also be modulated to transmit control data through the optical guide to the converter circuit and/or one or more electronic devices for controlling same. If no energy harvesting and no control data transmission is needed, the light source can be omitted.

In a fifth aspect of the present invention, an optical probe is provided, comprising an optical transmitter according to the first aspect, wherein the optical converter circuit is integrated in a distal end portion of the optical probe. Preferably, a proximal end of the optical probe is connectable to the photo detector arrangement of the receiver according to the second aspect.

The optical probe is for example a catheter or guidewire.

The advantages of the optical transmitter according to the invention also apply to the optical probe according to the invention. The optical probe has similar and/or identical preferred embodiments as the optical transmitter according to the invention.

In a sixth aspect of the present invention, a method of operating an optical link is provided, comprising:

providing an optical converter circuit having an optoelectronic device and circuitry connected to the optoelectronic device, the optoelectronic device having a plurality of individual optoelectronic segments, supplying a plurality of data streams to at least some of the segments and optically sending the plurality of data streams as spatially diverse data streams by emitting light from at least some of the optoelectronic segments under different angles into a single fiber of an optical guide, receiving through the optical guide on a photo detector arrangement having a plurality of photo detectors the plurality of data streams from the optoelectronic device, and extracting the plurality of data streams from the photo detector arrangement.

It will be understood that the claimed method has similar and/or identical preferred embodiments as the claimed optical link as described above and as defined in the dependent claims.

In a seventh aspect of the present invention, a computer program is provided, comprising program code means for causing a computer to carry out the steps of the method according to the sixth aspect, when said computer program is carried out on a computer.

It shall be understood that the claimed method has similar and/or identical preferred embodiments as the claimed devices and as defined in the dependent claims.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
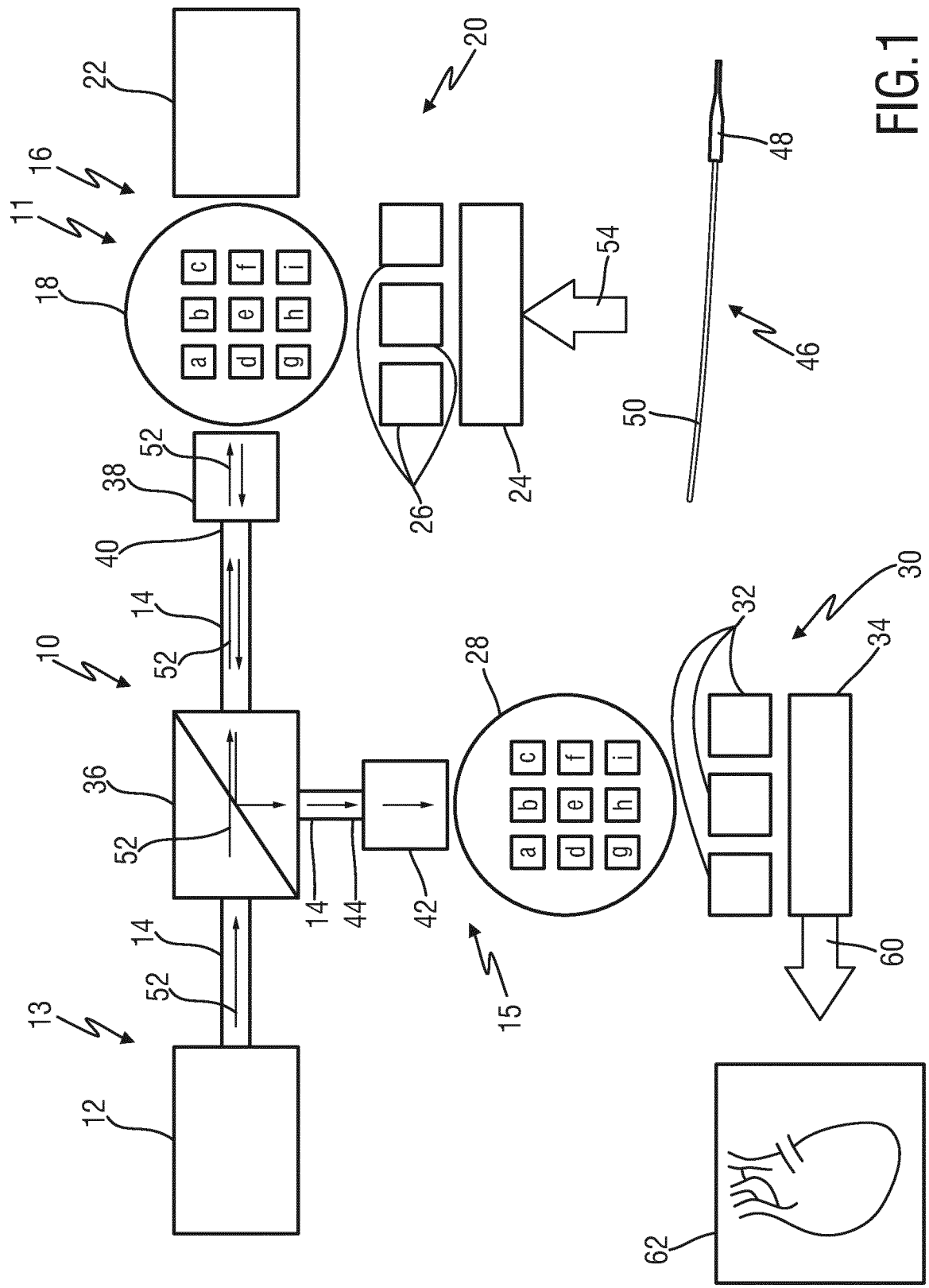
FIG. 1 shows a schematic embodiment of an optical transmitter, an optical receiver, an optical link, an optical probe and a console according to the present invention.

FIG. 1 shows an optical link labeled with general reference numeral 10 which comprises an optical transmitter 11 and an optical receiver 15. Further shown in FIG. 1 is a console 13, which may comprise the receiver 15 and a light source 12.

The light source 12 is capable of emitting light having an optical energy. The light source 12 preferably is a VCSEL. The light emitted by the VCSEL may be modulated in order to transmit control data. The light of the light source may also be used for energy harvesting as will be explained later. In case that control data transmission and energy harvesting is not needed, the light source can be omitted.

The optical link 10 further comprises an optical guide 14 which has a single optical fiber. The optical fiber may be a single-core multimode optical fiber, but also a multiple-core optical fiber. At least a part of the optical guide 14 is part of the optical transmitter 11.

The optical transmitter 11 further comprises an optical converter circuit 16. The optical converter circuit 16 comprises an optoelectronic device 18 and circuitry 20. The circuitry 20 may comprise electronics 22, e.g. for power extraction and control data extraction from the optoelectronic device 18. The electronics 22 is electrically connected to the optoelectronic device 18, accordingly. The circuitry 20 further comprises a data stream splitter 24 and one or more modulators 26 between the output of the data stream splitter 24 and the input of the optoelectronic device 18. The modulators 26 are electrically connected with the data stream splitter 24 and with the optoelectronic device 18, accordingly.

The optical receiver 15 comprises a photo detector arrangement 28 configured to detect light and convert the light into electrical signals. A processing unit 30 which is electrically connected to the photo detector arrangement 28 comprises one or more demodulators 32 and a data stream combiner 34.

The optical link 10 further comprises an optical beam splitter 36 which may be configured as dichroic mirror. The optical beam splitter 36 is arranged in the light path of the optical guide 14 between the light source 12 and the optoelectronic device 18 on the one hand, and between the optoelectronic device 18 and the photo detector arrangement 28, on the other hand. Again, if energy harvesting and control data transmission is not needed, the beam splitter 36 can be omitted, and the photo detector arrangement 28 can be arranged at a position, where the light source 12 is positioned in FIG. 1.

The optical transmitter 10 may further comprise a first GRIN lens 38 arranged between a first end 40 of the optical guide 14 and the optoelectronic device 18. The GRIN lens 38 preferably has a high NA, in particular an NA>0.3.

The optical receiver 10 may have a second GRIN lens 42 arranged between a second end 44 of the optical guide 14 and the photo detector arrangement 28. The GRIN lens 42 has a high NA, which may be >0.2.

Figure 2:
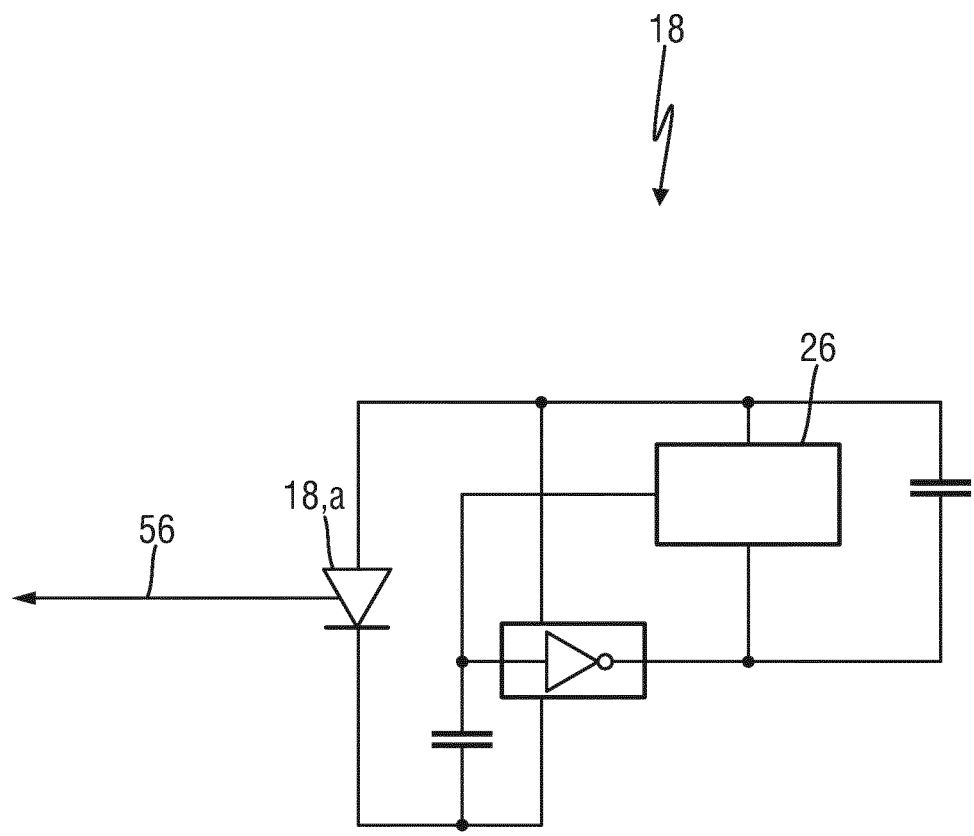
FIG. 2 shows an embodiment of a detail of the optical transmitter in FIG. 1.

The optoelectronic device 18 has a plurality of individual optoelectronic segments 18a to 18i which are labeled with letters a to i in FIG. 1. In particular, the optoelectronic device 18 is a segmented light emitting diode (LED), wherein the segments 18a to 18i each form a single micro-LED, wherein each of the LED segments 18a to 18i may be configured to convert light into electrical signals, and to convert electrical signals into light. In other words, each of the segments 18a to 18i functions as an LED by itself. In other embodiments, the optoelectronic device 18 may comprise a plurality of single LEDs, each LED forming a segment of the optoelectronic device 18. It is to be understood that the converter circuit 16 may comprise multiple electronic circuits to drive each of the segments 18a to 18i. An example of an electronic circuit for one segment is shown in FIG. 2 described later.

A subset or number of the segments 18a to 18i or all segments 18a to 18i may be connected in series with one another.

The optical transmitter 11, in particular the optoelectronic device 18 and the circuitry 20 can be integrated into an optical probe 46 which may be a catheter or guide wire or any other interventional instrument. In particular, the optical converter circuit 16 may be integrated in a distal tip portion 48 of the optical probe 46. The optical probe 46 may have one or more additional electronic devices (not shown), for example an ultrasound transducer, a camera, a measuring device, in the distal tip portion 48. These devices typically provide data streams which are to be sent by the transmitter 11 to the receiver 15, as will be described later in more detail. The GRIN lens 38 and a part of the optical guide 14 from the GRIN lens 38 up to the optical beam splitter 36 may also be integrated into the optical probe 46 in a portion 50 of the optical probe 46 which extends from the distal tip portion 48.

In the following, the optical link 10 and a method of operating same will be further described.

One function of the optical link 10 may be power supply in that light is transmitted from the light source 12 to the optical converter circuit 16, wherein the optoelectronic device 18 of the transmitter 11 converts optical energy transferred by the light into electrical energy, for powering the components of the optical converter circuit 16, and/or for powering any other electronic device in the distal tip portion 48 of the probe 46. In FIG. 1, the light emitted from the light source 12 is illustrated with arrows 52. This light is guided through the optical guide 14 through the optical beam splitter 36 and further through the optical guide 14 and then passes through the GRIN lens 38. The GRIN lens 38 collimates the light from the light source 12 onto some or all of the segments 18a to 18i of the optoelectronic device 18. Each of the segments 18a to 18i or at least some of the segments 18a to 18i convert the optical energy into electrical energy which may be stored in a capacitor (not shown) of the electronics 22 for further use as power supply to any of the components of the optical converter circuit 16 or other device(s) in the distal portion of the probe 46. In particular, when the segments 18a to 18i are connected in series, or at least some of the segments 18a to 18i are connected in series, the output voltage after conversion of the optical energy into electrical energy can be high. A high voltage is advantageous for specific ultrasound use of the probe 46. If a III/V LED is used as a single segment of the optoelectronic device, a single segment provides enough voltage for electronics, e.g. of the converter circuit 16.

When using the optoelectronic device 18 as an energy converter, or in other words as photovoltaic cell, the wavelength of the light emitted by the light source 12 should be shorter than the central wavelength of the light emission of the segments 18a to 18i of the optoelectronic device 18.

A further function of the optical link 10 may be control data transmission through the optical guide 14 to the optical converter circuit 16 and/or other electronic devices in the distal tip portion 48. To this end, the light emission of the light source 12 may be modulated with control data which are transmitted by the light emitted from the light source 12 to the optoelectronic device 18, and after conversion of the modulated light into electrical signals, the control data can be extracted by the electronics 22. The control data transmitted in this way can be used for controlling the optical converter circuit 16, and/or for controlling one or more electronic devices in the distal tip portion 48 as mentioned above.

A further and advantageous function of the optical link 10, in particular the optical transmitter 11, is to optically transmit data from the distal tip portion 48 of the optical probe 46 through the optical guide 14. Due to the configuration of the optoelectronic device 18 of the transmitter 11 with a plurality of individual segments 18a-18i, the optoelectronic device 18 is particularly suited to optically send data in the reverse direction, also denoted as "in the return path", i.e. from the optoelectronic device 18 through the optical guide 14 to the photo detector arrangement 28 of the receiver 15. In particular, due to the configuration of the optoelectronic device 18 having a plurality of individual segments, the optoelectronic device 18 is particularly suited to send multiple spatially diverse data streams, as will be described hereinafter. Furthermore, the configuration of the optoelectronic device 18 as a plurality of small surface area segments has the advantage that the capacitance of each of the segments 18a to 18i is lowered in comparison with a large surface area optoelectronic device. Low capacitance enables larger bandwidth and higher data rate in data transmission.

A single data stream is input to the data stream splitter 24 as illustrated by an arrow 54. The incoming data stream may, for example, come from an electronic device in the distal tip portion 48 of the probe 46, for example from an ultrasound transducer for capturing ultrasound images, from a camera, etc. The data stream splitter 24 splits the incoming data stream into a plurality of separate data streams, in other words breaks down the incoming data stream into a plurality of separate data streams. The separate data streams are then input to the modulators 26 for spatially modulating the separate data streams onto the segments 18a to 18i of the optoelectronic device 18. At least some or all of the segments 18a to 18i are used for data transmission in the return path, and, thus, at least some or all of the segments 18a to 18i are connected to a corresponding modulator 26.

The single segments 18a to 18i of the optoelectronic device 18 have different positions with respect to the adjacent end of the optical fiber of the optical guide 14. This means that the segments 18a to 18i emit their respective light beam carrying a data stream under different angles into the optical fiber. Each segment 18a to 18i may emit its light into the optical fiber at an angle which is different from all other angles of light emission of the other segments 18a to 18i. However, it is also possible that a first subset of the segments 18a to 18i emits light into the fiber at the same angle. In this case the segments of this subset are preferably used for sending a single data stream. Another subset emitting light into the fiber at a different angle than the first subset is used for sending another data stream. By spatially multiplexing the data streams, data rate is significantly increased.

The modulators 26 input the separate data streams to at least some or all of the segments 18a to 18i of the optoelectronic device 18 depending on which of the segments 18a to 18i are used for data transmission in the return path.

Due to the configuration of the optoelectronic device 18 having multiple segments 18a to 18i, which can be configured as a matrix or array arrangement of the segments 18a to 18i, the separate data streams coming from the modulators 26 may be spatially modulated onto the segments 18a to 18i or the corresponding subset of segments as mentioned before.

Thus, the optoelectronic device 18 described herein enables spaced-division multiplexing of the data streams which in turn may be based on a single original continuous data stream. However, it is also conceivable that the separate data streams may come from a plurality of different data sources, e.g. from a plurality of electronic devices.

FIG. 2 shows an embodiment of an electronic circuit for a segment 18a of the optoelectronic device 18. As mentioned before, each of the segments 18a to 18i forms a micro-LED itself. FIG. 2 shows a circuit in which the modulator 26 modulates the light emission (arrow 56) with data. The modulation of the light emission of a segment of the optoelectronic device 18 may be performed by pinching the load of the segment. Light emission of the segment may, for example, consist in a double flash for the data bit "0" and a single flash for the data bit "1". In practice, a more simple modulation scheme can be used, wherein a decrease of the amount of light emitted by the segment denotes a '0', and an increase of the light emitted by the segment denotes a '1', or vice versa, which allows for higher data rates. Further, some kind of 'whitening' scheme can be employed by modifying the data such that there will be no long sequences of '0' or '1' bits but instead a balanced load over time.

The segments 18a to 18i or a subset of the segments 18a to 18i optically send the spatially multiplexed data streams through the GRIN lens 38 into the optical guide 14, as illustrated with arrows 58. The light signals of different segments 18a to 18i enter the GRIN lens 38 and the optical guide 14, in particular the core of the optical fiber, under different angles, i.e. with an angle diversity, so that the separate data streams are transmitted as spatially multiplexed data streams through the optical guide 14. At the optical beam splitter 36, the light carrying the data streams is directed to the photo detector arrangement 28.

The photo detector arrangement 28 has a plurality of photo detector segments 28a to 28i labeled with letters a to i in FIG. 1, wherein the number of photo detector segments of the photo detector arrangement 28 may be the same as the number of segments 18a to 18i of the optoelectronic device 18. The GRIN lens 42 uniformly collimates the optical signals coming from the segments 18a to 18i of the optoelectronic device 18 onto the photo detector segments 28a to 28i of the photo detector arrangement 28. In principle, all segments 28a to 28i are used for receiving the optical signals from the optoelectronic device 18. When sending light under a specific angle through the optical guide 14, this corresponds to a specific mode. Different modes have different delays in the fiber and there will be some leakage to higher and lower order modes. By correlating the received signals, one can reconstruct the individual mode delays and thus advantageously combine the signals from all photo detector segments 28a to 28i to have the best reconstruction of the original signal. This can be further improved, if the concept of differential signaling is applied which will be explained farther below.

The photo detector segments 28a to 28i of the photo detector arrangement 28 optically receive the optical light beams with the spatially multiplexed data streams sent from the optoelectronic device 18 and convert the optical signals into electrical signals.

Like the segments 18a to 18i of the optoelectronic device 18, the photo detector segments 28a to 28i of the photo detector arrangement 28 may be arranged in a matrix or array.

When the optical signals are received by the photo detector arrangement 28, the spatial multiplexing is still maintained, because the optical signals emitted by the segments 18a to 18i of the optoelectronic device 18 maintain their different propagation angles up to the photo detector arrangement 28.

For enabling recognition of the received spatially diverse data streams at the photo detector arrangement 28, i.e. the segments 28a to 28i thereof, the data stream splitter 24 not only splits the incoming data stream into separate data streams, but also adds a preamble to each of the separate data streams. Several options are possible here. One option is to use different pseudo-random preambles for the individual data streams. Another option is to multiplex in time and use the same preamble at each channel individually. After learning the channel characteristics from the preamble, these characteristics are used for the duration of a data transmission (a packet) to decode the actual data.

The processing unit 30 uses these preambles when extracting the separate data streams from the photo detector signals from the single photo detector segments 28a to 28i. This can be advantageously done by the technique of maximum ratio combining which uses the preambles of each data stream. A correlation is performed between the photo detectors 28a to 28i against the preambles so that the maximum signal is achieved for each preamble as well as the suppression of the signals of the other segments 28a to 28i of the photo detector arrangement 28. The correlation can be a simple correlation at one moment in time, but could also be a correlation taking time delays into account and searching for the time delay which gives the highest correlation.

The demodulators 32 then demodulate the extracted data streams from the photo detector signals, and the data stream combiner 34 combines, i.e. demultiplexes the separate data streams into a single continuous data stream. This combined data stream is then output according to an arrow 60 for further processing, for example for visualization of an image based on this data stream.

In addition to the spatial multiplexing of the data streams and spatially multiplexed transmission of the data streams from the optoelectronic device 18 to the photo detector arrangement 28, it can also be envisaged to multiplex the data streams output from the data stream splitter based on wavelength. To this end, the single segments 18a to 18i of the optoelectronic device 18 may have center wavelengths of light emission which vary over the segment array or matrix.

Further, one of the major advantages of the optical link 10 is that energy harvesting and data transmission by the optoelectronic device 18 can be carried out simultaneously, i.e. optical energy can be continuously converted into electrical energy, and at the same time, multiple spatial data streams can be transmitted back from the optoelectronic device.

Further, in this regard, the optical link 10 is advantageously configured to use photo-induced electroluminescence.

In case of photo-induced electroluminescence, the light received by the optoelectronic device 18 from the light source 12, may be modulated to send information which is received by the segments 18a to 18i as a common mode signal which can be extracted from the harvested energy.

In general, photo-induced electroluminescence (PEL) is a type of luminescence, which occurs, when an LED is illuminated with light while its leads are connected to a resistance that is high enough for the LED to build up a voltage higher than the band gap of the LED. As a consequence, the LED will start to conduct and emit light, as it does in conventional electroluminescence. Thus, light entering the LED induces voltage in the LED, the voltage induces current through the LED, the current induces light emission by the LED. In case of efficient LEDs, this provides strong light emission without a current source and variation of the load of the LED will modulate the PEL output level.

Further in this regard, at least some or all of the segments 18a to 18i of the optoelectronic device 18 in connection with their ability of energy harvesting at the same time may be used for differential signaling in the return path. This will be explained in the following.

For a single LED, by modulating the load on the illuminated LED, PEL is generated, wherein the LED returns light at a different wavelength than the incoming light received by the LED. The amount of light that is returned is dependent on the load on the LED: If less current is drawn, the voltage goes up and the LED emits more light. Variation of the load changes the amount of light emitted by the LED. However, it may be desirable to keep the total load constant for the device. This can be achieved with the optoelectronic device 18 having a plurality of segments 18a to 18i by differential signaling.

The optoelectronic device 18 has multiple segments 18a to 18i. The segments 18a to 18i are used for energy harvesting and signaling in the return path simultaneously. At a certain power consumption, a segment is in a certain working point which is a certain load on the segment (e.g., 50% load). Normally, when sending a signal for a single data transmission channel, the amount of light emitted by the segment would be increased for the value '1' and decreased for a value '0' in the binary case. With PEL this may be done by changing the load on the individual segment. Thus, when sending a signal, power consumption is being increased when sending a '1' and being decreased when sending a '0'. Since the individual segments 18a to 18i are not correlated with one another, there can be large variations in the total power consumption if coincidentally all channels send a '1' or a '0' at the same time.

With differential signaling, some of the segments 18a to 18i are modulated in a correlated manner such that the total power consumption remains constant. In case of a simple binary modulation (sending '0's and '1's), this means for example that two of the segments 18a to 18i are modulated in anti-phase, i.e. if the one is modulated with '1', the other is modulated with '0', and vice versa.

As an example: Considering for example the segments 18a, 18b, 18c, 18d, each emitting its light beam into the optical fiber of the optical guide 14 at a different angle, and each forming an individual data transmission channel (C1, C2, C3, C4). According to differential signaling, if a '1' is transmitted on channel C3, for example, also a '0' is transmitted on channel C4, thus C3 and C4 transmit in anti-phase, resulting in the total power consumption remains the same, and a further advantage is that the data streams are sent under different angles and in anti-phase leading to a more robust demodulation at the detector arrangement 28. Further, if a '1' is transmitted on channel C2, a '0' is transmitted on channel C1, etc. Because the segments are modulated as pairs in anti-phase, the total load remains constant over all segments, because one segment which is loaded less is compensated by another segment loaded more.

In the optical fiber of the optical guide 14, this results in an increase of the amount of light under one angle and a decrease of the amount of light under another angle. This also leads to a more robust transmission of the data streams, because one can "look for" an increase of light in one channel and a decrease of light in another channel to reliably detect a '1' and a '0' in the detector arrangement 28. In total, the differential signaling disclosed herein improves both the ability to have a constant power consumption at a constant load as well as the robustness of the data transmission in the return path.

While an example of the differential signaling has been given above for the simple case of binary modulation, where two of the segments 18a to 18i are paired and modulated in anti-phase, the concept of differential signaling can also be employed in case of multilevel modulation. As an example with reference to the example above: Sending a '1' on channel C3 (segment 18c) with 100% output (50% load), and bringing the output of segments 18b (channel C2) and 18d (channel C4) from 50% to 25% and in each case (2*-25%=-50% load), could be done in multilevel modulation. Again, constant load is obtained along with an increase of robustness of data transmission by correlating across multiple channels here. This enables spreading the signal over multiple channels to increase robustness.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An Optical transmitter, comprising:
   an optical converter circuit having an optoelectronic device and circuitry connected to the optoelectronic device, the optoelectronic device having a plurality of individual optoelectronic segments; and
   an elongated optical guide having a single optical fiber optically connected at a first end to the optoelectronic device and configured to transmit light away from the optoelectronic device, wherein the individual optoelectronic segments have different positions relative to the first end of the single optical fiber so that light beams emitted by the plurality of individual optoelectronic segments are coupled into the single optical fiber under different angles, the optoelectronic device being configured to receive from the circuitry on at least some of the plurality of individual optoelectronic segments a plurality of data streams and optically send, via the light beams emitted by the at least some of the plurality of individual optoelectronic segments, the plurality of data streams as spatially diverse data streams into the elongated optical guide, wherein the circuitry of the optical converter circuit has a data stream splitter configured to split a single original data stream into a plurality of separate data streams, wherein each of the separate data streams is input to one of at least some of the plurality of individual optoelectronic segments, and wherein the circuitry further has modulators at an output of the data stream splitter and at an input of at least some of the plurality of individual optoelectronic segments of the optoelectronic device, the modulators being configured to modulate the separate data streams onto the at least some of the plurality of individual optoelectronic segments.

2. The optical transmitter of claim 1, wherein the optoelectronic device is further configured to receive optical energy through the elongated optical guide and convert the optical energy into electrical energy.

3. The optical transmitter of claim 1, wherein the data stream splitter is further configured to add a preamble to each of the separate data streams.

4. The optical transmitter of claim 1, wherein the at least some of the plurality of individual optoelectronic segments of the optoelectronic device to which the separate data streams are input have different center wavelengths of light emission.

5. The optical transmitter of claim 1, wherein at least some of the plurality of individual optoelectronic segments of the optoelectronic device are connected in series.

6. The optical transmitter of claim 1, wherein the optoelectronic device is a light emitting diode segmented into a plurality of light diode segments forming the plurality of individual optoelectronic segments.

7. The optical transmitter of claim 1, wherein the plurality of individual optoelectronic segments are single light emitting diodes.

8. The optical transmitter of claim 1, further comprising a gradient refractive index (GRIN) lens arranged between the optoelectronic device and the elongated optical guide for optically coupling the light emitted from the optoelectronic device into the elongated optical guide.

9. An optical probe, comprising the optical transmitter according to claim 1, wherein the optical converter circuit is integrated in a distal end portion of the optical probe.

10. An optical transmitter, comprising:
an optical converter circuit having an optoelectronic device and circuitry connected to the optoelectronic device, the optoelectronic device having a plurality of individual optoelectronic segments;
an elongated optical guide having a single optical fiber optically connected at a first end to the optoelectronic device and configured to transmit light away from the optoelectronic device, wherein the individual optoelectronic segments have different positions relative to the first end of the single optical fiber so that light beams emitted by the plurality of individual optoelectronic segments are coupled into the single optical fiber under different angles, the optoelectronic device being configured to receive from the circuitry on at least some of the plurality of individual optoelectronic segments a plurality of data streams and optically send, via the light beams emitted by the at least some of the plurality of individual optoelectronic segments, the plurality of data streams as spatially diverse data streams into the elongated optical guide; and
comprising a gradient refractive index (GRIN) lens arranged between the optoelectronic device and the elongated optical guide for optically coupling the light emitted from the optoelectronic device into the elongated optical guide.

11. The optical transmitter of claim 10, wherein the optoelectronic device is further configured to receive optical energy through the elongated optical guide and convert the optical energy into electrical energy.

12. The optical transmitter of claim 10, wherein the at least some of the plurality of individual optoelectronic segments of the optoelectronic device to which separate data streams are input have different center wavelengths of light emission.

13. The optical transmitter of claim 10, wherein at least some of the plurality of individual optoelectronic segments of the optoelectronic device are connected in series.

14. The optical transmitter of claim 10, wherein the optoelectronic device is a light emitting diode segmented into a plurality of light diode segments forming the plurality of individual optoelectronic segments.

15. The optical transmitter of claim 10, wherein the plurality of individual optoelectronic segments are single light emitting diodes.

16. The optical transmitter of claim 10, further comprising a gradient index lens arranged between the optoelectronic device and the elongated optical guide for optically coupling the light emitted from the optoelectronic device into the elongated optical guide.

17. An optical probe, comprising the optical transmitter according to claim 10, wherein the optical converter circuit is integrated in a distal end portion of the optical probe.

* * * * *